United States Patent [19]

Van De Mark

[11] Patent Number: 4,956,115
[45] Date of Patent: Sep. 11, 1990

[54] WATER BORNE SOLVENT STRIPPERS

[75] Inventor: Michael R. Van De Mark, Rolla, Mo.

[73] Assignee: Hoechst Celanese Corporation, Somerville, N.J.

[21] Appl. No.: 355,508

[22] Filed: May 23, 1989

[51] Int. Cl.$^5$ .......................... C11D 7/50; C11D 7/26; C11D 3/43
[52] U.S. Cl. .................................... 252/170; 252/162; 252/172; 252/364; 252/DIG. 8; 134/38
[58] Field of Search .......... 252/162, 170, 172, DIG. 8, 252/DIG. 14, 364, 171; 134/38; 549/368

[56] References Cited

U.S. PATENT DOCUMENTS 3,313,713 4/1967 Marbin .................................. 203/92
4,595,396 6/1986 Erdma ..................................... 44/63

FOREIGN PATENT DOCUMENTS 1668867 12/1971 Fed. Rep. of Germany .
129281 10/1980 Japan .
167584 10/1983 Japan .

Primary Examiner—Paul Lieberman
Assistant Examiner—Kathleen Markowski
Attorney, Agent, or Firm—Depaoli & O'Brien

[57] ABSTRACT

Aqueous stripper compositions comprising aqueous emulsions of trioxane have been found to be effective for stripping coatings from surfaces. The composition typically contains water, trioxane, a surfactant and optionally a mixture of cosolvents comprising an aliphatic alcohol, an ester of an aliphatic carboxylic acid and an aromatic hydrocarbon or minimally hetero-substituted derivative thereof. The amount of the organic cosolvent is limited to about 30 wt. % to provide a stripper composition which is less volatile and more biodegradable than conventional stripper compositions.

27 Claims, No Drawings

WATER BORNE SOLVENT STRIPPERS

This application is related to co-pending, commonly assigned U.S. Ser. No. 347,270, filed May 4, 1989 and U.S. Pat. No. 4,830,772.

BACKGROUND OF THE INVENTION

1. Field of the Invention

This invention relates to compositions for removing or stripping paint, varnish, and like coatings from wood, metal, concrete and related surfaces. It particularly relates to water borne solvent compositions for removing or stripping coatings from surfaces at ambient to elevated temperatures.

2. Review of the Prior Art

Removal of protective coatings from wood and metal surfaces has long been a difficult and laborious operation involving the use of flame, heat, and/or chipping tools. Such labor has been minimized by using solvents to soften and/or lift a coating from a protected surface.

Paint and varnish removers are of two main types according to method of use: application removers and immersion removers. Application removers are usually applied by brushing or spraying and are used for small jobs or for items that cannot be immersed. Immersion removers are used as either cold or hot baths where it is practical and cost efficient to install equipment that can strip numerous items. Cold baths contain solvents such as methylene chloride, and hot baths often contain caustic soda.

Compositions for removing protective coatings have generally utilized methylene chloride and other halogenated aliphatic hydrocarbons. According to the "Kirk-Othmer Encyclopedia of Chemical Technology," Vol. 16, pp. 762–768, a typical methylene chloride remover contains 70–85% methylene chloride, 5–10% alcohol co-solvent, typically methanol, and 0–10% hydrocarbon solvent or ketones, the remainder being paraffin wax, methylcellulose, an amine, and surfactants or emulsifiers. As disclosed in this passage from "Kirk-Othmer", paint and varnish removers other than methylene chloride are also known including inexpensive solvents and blends of solvents including acetone, methyl ethyl ketone, toluene, xylene, blends of alcohol and acetates, tetrahydrofuran, dimethylformamide, and 1,1,2-trimethoxyethane.

Many patents disclose specific coating remover compositions which contain chlorinated hydrocarbon solvents. Below are listed typical examples.

U.S. Pat. No. 2,495,729 discloses use of a film-forming base material, such as cellulose esters to increase the viscosity and form a protective film which enables the solvent and softening agents of a coatings remover to be confined within the film to exert maximum softening and solvent action. The solvents include a mixture of benzene and aliphatic alcohols or cyclic aliphatic oxides, such as tetramethylene oxide. An aliphatic acid ester, such as ethyl acetate in acetone can also be added. The benzene may be replaced by a mixture of halogenated aliphatic hydrocarbons.

U.S. Pat. No. 3,179,609 describes compositions useful for removing coatings and finishes such as paints, varnishes, lacquers, shellac, gums, and natural and synthetic resins which comprise (a) an active organic solvent, including binary, tertiary, etc., mixtures thereof, (b) a viscosity thickener comprising resinous polyethylene oxides), and (c) an evaporation retardant or film-forming compound. Numerous solvents (a) are disclosed including binary mixtures. Methylene chloride containing benzene, methanol, acetone, and the like are preferred.

U.S. Pat. No. 3,538,007 discloses a paint stripper comprising 54–77 parts of chlorinated liquid hydrocarbon solvent, 1–4 parts of carboxylic acid having 1–4 carbons, 1–6 parts of propargyl alcohol, 0–2 parts of nonionic wetting agent, 0–15 parts of liquid aromatic hydrocarbon solvents, 0–6 parts of a coupling agent, 0–30 parts of phenol or alkyl substituted phenol, 0–2 parts of a thickener, and 0–2 parts of an evaporation retarder. The aromatic liquid hydrocarbon can be benzene, toluene, or xylene.

U.S. Pat. No. 3,574,123 describes a paint stripper comprising 50–90 parts of a chlorinated liquid hydrocarbon solvent, 2–15 parts of a lower aliphatic alcohol or glycol ethers, 0.1–15 parts of a lower carboxylic acid, 2–30 parts of hydroxybenzenes, 2–10 parts of a fatty acid sulfonate or a salt of a fatty amine carboxylic acid, and 0.1–10 parts of aqueous ammonium bifluoride. This composition can also contain inert organic aromatic hydrocarbon solvents such as benzene, toluene, xylene, ethylbenzene, otho-ethyltoluene, di-ethylbenzene, and isopropyl benzene, the lower alkyl substituted benzenes boiling at 170° F. and higher being preferred.

U.S. Pat. No. 3,592,691 describes the removal of photo resist mask residuals from a semiconductor substrate by immersing the substrate in a photoresist solvent and heating the solvent at 150–250° C. and at a pressure of about 300 psig for a time period of $\frac{1}{4}$–3 hours. The solvent composition comprises trichloroethylene, isopropanol, and xylene with up to a few percent of methylene chloride. The isopropanol may be replaced wholly or partially with lower boiling point aliphatic alcohols such as ethanol.

U.S. Pat. No. 3,743,542 describes a method for removing paint from metal surfaces by boiling a solvent or solvent mixture and contacting the painted metal surface with the vapors of the solvent mixture, preferably while refluxing the vapors in a closed system. It is especially useful for removing durable paints such as those based on vinyl, acrylic, or epoxy resins. The stripping composition comprises solvents and mixtures thereof including chlorinated liquid hydrocarbons, hydrogenated aromatic solvents, saturated heterocyclic compounds, surface active agents, imidazole derivatives, alkynyl alcohols, glycol ethers, carboxylic acids, ethanolated alkyl quanidine amine complexes, and aliphatic alcohols.

Examples of patents which disclose alternative solvents are mentioned below.

U.S. Re No. 27,432 is directed to a process for removing polymeric materials from processing equipment with tetrahydrofuran. It teaches that numerous solvents have been known for dissolving vinyl halides of various molecular weights including trimethylene oxide, tetramethyl urea, dimethyl acetamide, tetrahydrofuran, cyclohexanone, cyclopentanone, cyclohexene oxide, diethyl acetamide, methyl ethyl ketone, and dioxane.

U.S. Pat. No. 3,784,477 relates to removal of paints, varnishes, and similar finishes from wood and metal objects without damage to grain or glue joints. It teaches that xylene or aromatic naphthas can be used as an extender for solvents dimethylformamide or dimethyl acetamide, with little change in paint removal activity, and further that xylene can be diluted or extended freely with methyl alcohol up to about 20% of its weight.

It is also known to incorporate cyclic ethers, including trioxane, into cleaning and coating remover solvents.

For example, U.S. Pat. No. 3,723,331 discloses a method for stabilizing halogenated solvents derived from aliphatic saturated hydrocarbons. Stabilization is accomplished by incorporating therein trioxane associated with an aliphatic alcohol, particularly tertiary butanol and/or an epoxide which is liquid at ordinary temperature, particularly butylene oxide. The compositions are used as solvents for grease removal and/or for cleaning of metal parts or components. British Patent No. 2,024,243 discloses a similar composition for stabilizing 1,1,1-trichloroethane in which tertiary butyl alcohol, trioxane, an epoxide, a nitroalkane and an aliphatic or cyclic amine are added.

U.S. Pat. No. 3,904,430 describes a method of cleaning a contaminated article in a system which comprises using a solvent mixture comprising a halogenated hydrocarbon solvent and an auxiliary solvent which does not form a azeotrope with the halogenated hydrocarbon solvent wherein the article is contacted with a first heated liquid mixture of the solvents and the article rinsed with a second liquid mixture containing a lower proportion of the auxiliary solvent. Auxiliary solvents which are disclosed include alcohols and cyclic ethers of which 1,4-dioxane is specifically disclosed.

German Offenlegungsschrift No. 2,118,870 discloses a paint remover and solvent for varnishes and paints comprising an acetal of diol such as 1,3-dioxolane and 5 to 60 parts, preferably 10 to 40 parts, based 100 parts of the cyclic acetal or acetal blend of trioxane. The addition of trioxane results in the retention of the volatile solvents that are effective during the paint removal. Specific examples using trioxane include 1,3-dioxolane/trioxane in a 4:1 mixing ratio, and butane diol-1,4-formal/trioxane in a 7:3 mixing ratio.

German Offenlegungsschrift No. 2,123,563 discloses a paint remover, solvent, and the like based on organic solvents containing 5 to 60 and preferably 10 to 50 parts by weight of trioxane based on 100 parts per weight of the mixture as a retention agent. Specific examples include trioxane mixed with each of chlorinated hydrocarbons, xylene, ethyl acetate, methyl ethyl ketone and acetone.

In application U.S. Ser. No. 205,143, filed June 10, 1988, now U.S. Pat. No. 9,830,772, the inventor discloses a coating stripper composition based on trioxane. The composition preferably contains equal amounts of trioxane and co-solvents of an aliphatic alcohol such as methanol and an aromatic hydrocarbon such as xylene.

While stripper compositions containing benzene, xylene, toluene, methylene chloride, and mixtures thereof have enjoyed commercial success, these solvents have important disadvantages. For example, these solvents are not readily biodegradable, are toxic and harmful to human skin, and are highly volatile, thus, dispersing into the atmosphere and rendering the stripper composition less useful due to evaporation from the coating surface. In general, these solvents are harmful to both the extended environment including soil, air, ground water and the localized environment where the solvents are being used and where the user must take substantial care to avoid skin contact and excessive inhalation of solvent vapor.

Unfortunately, many surfaces having coatings that need to be removed are located out of doors, such as homes made of wood or painted brick, commercial buildings, and industrial structures which are, exemplified by steel monuments, distillation columns, steel bridges, paper mills, steel ships, and the like. After application of the stripper, the lifted coating must also be physically removed from the surface before it can be painted again. Removing methylene-stripped coatings from such surfaces may require use of ladders and suspended platforms and arms-length work on the lifted coatings, and, thus, can be harmful and even dangerous to workmen. Moreover, the use of conventional stripper solvents presents major environmental hazards, when employed on a large scale, because such solvents are highly volatile and are not readily biodegradable.

There is consequently a need for a stripper composition which has reduced levels of toxic solvents, which, for example, is water borne, readily biodegradable, and effective. There is also a need for a stripper which can be removed by use of water and particularly by use of a jet or stream of water which can be applied to the stripped surface from a distance.

SUMMARY OF THE INVENTION

Accordingly, it is an object of this invention to provide an effective aqueous stripping composition.

It is another object of the invention to provide a water-based stripping composition which has minimal levels of caustic and toxic solvents.

It is another object of this invention to provide a stripping composition comprising an aqueous emulsion of trioxane.

It is a further object to provide water-emulsified trioxane stripping compositions that are stable microemulsions.

It is a still further object of this invention to provide stripping compositions that are more biodegradable and are of lower toxicity than conventional solvent-containing strippers.

Still, yet another object of this invention is to provide a stripping composition which is less volatile and, thus, provides greater coverage and is less environmentally harmful than conventional solvent-containing strippers.

It is still another object to provide stripping compositions that enable the lifted coatings to be removable by application of a jet of water.

In accordance with these objects and the principles of this invention, it has surprisingly been discovered that an aqueous emulsion of trioxane is a useful coating stripper. The aqueous trioxane stripper composition of this invention can be modified by the addition of co-solvents which enhance the effectiveness of the trioxane-based stripper. The amounts of the co-solvents are minimized so as not to significantly increase the toxicity and reduce the biogradability of the water-borne stripper of this invention.

Thus, it has been found that a composition comprising trioxane, an aliphatic alcohol, an aliphatic ester, an aromatic compound, and a surfactant which can be anionic, cationic, or neutral can be dispersed in water and form a stable stripper composition. The stripper composition has improved biodegradability, a higher flash point and is less harmful to the environment relative to conventional solvents, and can quickly lift coatings from surfaces such as metal, concrete and wood while enabling the lifted coatings to be removed by application of water and particularly by application of a water jet. Moreover, the stripper composition of this invention has increased effectiveness, i.e., lower stripping times, as the temperature increases.

DESCRIPTION OF THE PREFERRED EMBODIMENTS

The compound, 1,3,5,-trioxane, is commonly referred to as trioxane or trioxymethylene. Trioxane as used herein is a cyclic trimer of formaldehyde having the structural formula below:

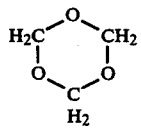

At room temperature, trioxane is a solid and only about 20% water soluble. However, the typical cosolvents are insoluble. While aqueous trioxane solutions or dispersions have some stripping capability, it is useful to add cosolvents. Accordingly, to readily disperse the stripping mixture in water to form a relatively stable emulsion, it is useful to include a surfactant to the composition. Useful surfactants may be selected from anionic, cationic and neutral surfactants and, accordingly, the surfactant can be selected from a wide class of known surfactant materials. It is preferred to utilize surfactants that have an HLB of at least 10.0 and, more preferably, surfactants which have an HLB of greater than about 30 to provide a micro emulsion of the trioxane in water. An extensive list of surfactants including an HLB index of surfactants is provided in *McCutcheon's Emulsifiers & Detergents*, 1986, North American Edition, MC Publishing Co., Glen Rock, N.J., pages 293-316, which is herein incorporated by reference. Among the preferred surfactants which can be utilized include the alkali metal salts of fatty acids such as those having at least 10 carbon atoms. Among these include sodium laurate, sodium myristate, sodium palmitate, etc. Also preferred are anionic sulfate surfactants including sodium alkyl sulfates, sodium alky aryl sulfates and sodium alkyl ether sulfates including sodium lauryl sulfate, sodium octyl sulfate, sodium oleyl sulfate, sodium tridecyl sulfate, sodium 2-ethylhexyl sulfate, sodium tridecyl ether sulfate, etc.

In general, the stripper compositions of the present invention will contain at least 30 wt.% water, typically from 30 to 70 wt.% water and from about 5 to 30 wt.% trioxane, with any balance comprising surfactant and cosolvents. The surfactant may typically be present in amounts of from about 5 to 20% by weight. Cosolvents may comprise from about 10 to no greater than 30 wt.% of the composition. If the cosolvent is added in amounts less than 10 wt.%, little improvement is seen in the stripping ability of the aqueous trioxane emulsion. However, amounts of cosolvents greater than about 30 wt.% should be avoided inasmuch as increases in the content of these cosolvents translates into increases in the potential toxicity of the stripper and an increase in adverse environmetal impact of the stripper composition. It is most preferred that the amount of cosolvent not exceed about 25 wt.% of the total stripper composition.

It is preferred to add the organic cosolvents to modify the aqueous trioxane emulsion so as to better emulate the solubility properties of methylene chloride which is one of the most successful stripper solvents. In particular, it is necessary to modify the properties of trioxane especially with respect to hydrogen bonding capabilities. In the aqueous trioxane stripper composition of this invention, the cosolvents which are added are used to modify the hydrogen bonding capabilities of the trioxane as well as provide for better dispersion of the trioxane in the composition. Thus, the organic cosolvents which are used include each of an aromatic hydrocarbon, an aliphatic alcohol and an aliphatic ester. In general, if the organic cosolvents are added, they are added in amounts as follows: 1-10 wt.%, preferably 2-5 wt.% of a hydrocarbon aromatic or minimally hetero-substituted aromatic, 5-12 wt.%, preferably 7-12 wt.% of an aliphatic alcohol and 5-14 wt.%, preferably 8-12 wt.% of an ester of an aliphatic acid.

In general, the preferred stripper compositions of the present invention comprise 30-65 wt.% water, 7-25 wt.% trioxane, 5-10 wt.% surfactant, 0-5 wt.% aromatic hydrocarbon, 0-12 wt.% alcohol and 0-12 wt.% ester.

A more preferred composition according to the present invention comprises about 30-60 wt.% water, 7-20 wt.% trioxane, 5-10 wt.% surfactant, 2-5 wt.% aromatic hydrocarbon, 8-12 wt.% alcohol and 8-12 wt.% ester. It is preferred to have the amount of the alcohol and the ester be approximately equal by weight. It is also preferred to select the cosolvents so as to provide an aqueous trioxane composition having a flash point of at least 100° F. and more preferably, at least 110° F. to reduce excessive evaporation of the stripper components from the surface being stripped. It is believed that being able to fashion an effective stripper composition having relatively high flash points is one of the advantages the stripper of this invention has over conventionally used stripper compositions which typically have flash points well below 100° F.

Suitable aromatic hydrocarbons for use in the coating strippers of this invention include benzene, toluene, xylenes, alkylbenzenes, and alkyl-substituted toluene and xylene. A xylene or a mixture of xylenes are the preferred aromatic solvents. Alkylbenzenes, such as ethyl benzene, di-ethylbenzene, isopropyl benzene, otho-ethyltoluene, trimethylbenzenes, and cumene are reasonably satisfactory. In general, alkyl benzenes having an alkyl group of not more than $C_5$ are useful in this invention. It is also to be understood, that non-hydrocarbon aromatics can be used so long as the hetero groups are minimized and do not significantly change the hydrogen bonding properties of the corresponding non-substituted aromatic hydrocarbon. The hetero substituents should be mono-substituted off the aromatic ring carbons. Among the useful substituents include carbonyl groups, ether groups and ester groups. Specific compounds include $C_1$-$C_4$ alkoxy benzenes such as methoxy benzene, propoxy benzene, and the like, and $C_1$-$C_4$ alkyl benzoate esters such as methyl benzoate, ethyl benzoate, etc. Thus, the aromatic hydrocarbons as used in this invention include such minimally hetero atom-substituted aromatics.

The useful aliphatic alcohol includes $C_1$-$C_6$ alcohols. Examples may be selected from methanol, ethanol, isopropanol, n-propanol, n-butanol, isobutanol, tert-butanol, amyl alcohol, n-hexanol, etc. The alcohol component not only has solvent properties but has been found to be important as a co-surfactant. Thus, variations in the type of alcohol used has produced variations in the stability of the trioxane emulsion. Amyl alcohol has been found to be most useful as a co-surfactant and provides for aqueous trioxane micro-emulsions which are extremely stable.

The esters which are useful include the $C_1$-$C_4$ alkyl esters of $C_2$-$C_6$ alkanoic acids. Among these include ethyl acetate, propyl acetate, butyl acetate, butyl propionate, etc. Other useful esters include alkylene glycol esters of alkanoic acids and alkylene glycol monoalkyl ether esters of alkanoic acids as for example propylene glycol monomethyl ether acetate.

The paint stripper compositions of this invention are useful for removing or stripping a wide variety of coatings such as paints, varnishes, enamels, lacquers, and the like, and more particularly neoprenes, polyesters, polycarbonates, silicon elastomers, phenolics, vinyl halide polymers and copolymers, acrylates, and polyvinyl alcohol coatings at ambient temperatures. It is particularly suitable for alkyd, latex, and urethane paints and for varnishes.

It has also been discovered that the aqueous trioxane stripper compositions of this invention have enhanced ability to strip coatings at increased temperatures. This discovery is advantageous for several reasons, one being that many stripping operations involve removing the coating from surfaces which are exposed to sunlight which can vastly increase the temperature of the surface and thus, improving the effectiveness of the water borne stripper compositions of this invention. At the same time, since the stripper compositions of the present invention have high flash points, the stripper composition does not evaporate from the surface, thus, increasing the effectiveness of the composition and minimizing evaporation of the solvent into the atmosphere. The enhanced effectiveness of the stripper composition of the present invention also illustrates that the water borne trioxane emulsion could be useful in hot stripper tanks.

Many of the compositions of this invention are in the form of relatively stable emulsions and are generally of a milky white appearance. If the phases have separated because of time in storage, the emulsions can readily be reformed by vigorous agitation. The preferred compositions of the present invention are stable micro emulsions which are clear and of a single phase. Such compositions are achieved by the use of surfactants having an HLB of greater than about 30. Such micro emulsions are stable and will not separate.

The following examples are intended to illustrate the invention only and are not to be construed as strictly limiting the invention, including the appended claims, to the embodiments shown therein.

EXAMPLES 1-10

Numerous compositions were formulated and evaluated for the ability to form a stable emulsion. Some of the emulsions were tested for stripping efficacy. Several of the compositions were found to be excellent microemulsions, but many others were satisfactory emulsions and are suitable for the purposes of this invention. The components of each composition are listed in Table I as percentages by weight.

TABLE I

WEIGHT PERCENTAGES OF COMPONENTS IN WATER BORNE STRIPPING COMPOSITIONS

| | Example Numbers | | | | | | | | | |
|---|---|---|---|---|---|---|---|---|---|---|
| | 1 | 2 | 3 | 4 | 5 | 6 | 7 | 8 | 9 | 10 |
| Water | 64.5 | 64.5 | 75.0 | 68.2 | 65.2 | 63.8 | 49.2 | 48.5 | 48.9 | 49.2 |
| Trioxane | | | | 9.1 | 8.7 | 8.5 | 13.1 | 12.9 | 15.7 | 15.0 |
| n-Butanol | 9.7 | 9.7 | 10.0 | 9.1 | 8.7 | 10.6 | 13.1 | 12.9 | 9.8 | 8.1 |
| Amyl alcohol | | | | | | | | | | 1.9 |
| SDS[1] | | | | | | | | | 7.8 | 9.2 |
| Triton X-100[2] | 9.7 | 12.9 | 10.0 | 9.1 | | | | | | |
| Triton CF-10[3] | | | | | 10.9 | 10.6 | 3.3 | 3.2 | | |
| Natrosol 330 PA | | (Thickener) | | | | | | 1.3 | | |
| n-Butylacetate | | | | | | | 13.1 | 12.9 | 11.7 | 11.7 |
| Cellulose | | | | | | | | | 1.2 | |
| Toluene | | | | | | 6.4 | 8.2 | 8.1 | | |
| Xylene | 16.1 | 12.9 | 5.0 | 4.5 | 6.5 | | | | 4.9 | 4.9 |

[1]Sodium Dodecyl Sulfate, HLB = 40
[2]Octylphenoxy polyethoxy ethanol, HLB = 13.5
[3]Alkylaryl polyether, HLB = 14.0

EXAMPLE 1

The materials listed in Table I were mixed at high speed to a uniform emulsion (creamy white) which did not appear to be very stable. The test stripping rate on alkyd was 290 seconds. Phase separation occurred.

EXAMPLE 2

The surfactant was added to the water and the remaining materials listed in Table I were added with constant stirring to produce a milk-like emulsion which still lacked stability.

EXAMPLES 3 and 4

The materials listed in Table I were mixed in the same order as in Example 2. Both were milky and lacked stability, but the emulsion of Example 4 was less stable than the emulsion of Example 3. The stripping rates of alkyd coatings for Examples 3 and 4, respectively, were 450 seconds and 280 seconds.

EXAMPLE 5

The order of addition with vigorous stirring of the materials listed in Table I was water, surfactant, n-butanol, xylene, and trioxane. The resulting emulsion was milky white but unstable.

EXAMPLE 6

Substituting toluene for xylene, the materials listed in Table I were added in the same order as in Example 5. An unstable emulsion resulted.

EXAMPLE 7

The materials given in Table I were added in the following order with vigorous stirring: water, surfactant, n-butanol, n-butylacetate, toluene and trioxane. The resulting emulsion was unstable.

EXAMPLE 8

The composition of Example 8 was prepared in the same manner as Example 7 except that 4 g of Natrosol 330PA were first premixed with the n-butanol and then added to the aqueous surfactant system. It was hoped that this thickening would stabilize the emulsion. The resulting thick milky solution appeared to be relatively stable. An alkyd coated steel panel was tested with this emulsion. The alkyd coating was removed in 190 seconds at room temperature. Another alkyd coated steel panel was exposed to sunlight out of doors until heated. The stripping solution was applied. Removal of the alkyd coating occurred in 32 seconds.

EXAMPLE 9

The water and surfactant were premixed, and the butanol and cellulose were premixed and added to the aqueous surfactant. Next, the remaining materials were mixed at high speed, resulting in a milky solution which was modestly stable.

EXAMPLE 10

Water and the sodium dodecyl sulfate surfactant were premixed, and the remaining materials except the amyl alcohol were then added with rapid mixing, resulting in an unstable emulsion.

Amyl alcohol was slowly added while rapidly mixing the materials. After about 5 g had been added, the composition was clear, indicating that a stable micro-emulsion, having one macrophase, had been produced.

Amyl alcohol is apparently a better co-surfactant than n-butanol and increased the stability of the formulation.

EXAMPLES 11–19

The compositions of each example are set forth in Table II as percentages by weight. The compositions were observed for stability of the emulsion and tested on coatings to determine the efficacy of stripping ability. The results are listed in Table III. In Table III, "2 D" signifies two days of ageing for the coating of a tested panel, and "1 W" indicates one week of ageing thereof. The composition of Example 15 was the most effective.

TABLE III

| EXAMPLE | STRIPPING TIME[1] | | | | | | | |
|---|---|---|---|---|---|---|---|---|
| | URETHANE | | ALKYD | | LATEX | | VARNISH | |
| | 2 D | 1 W | 2 D | 1 W | 2 D | 1 W | 2 D | 1 W |
| 11 | 132.1 | 97.2 | 82.7 | 62.8 | 271.8 | 66.6 | 329.0 | 45.9 |
| 12 | 149.2 | 149.4 | 141.8 | 132.5 | 510.0 | 1,202 | 352.0 | 378.0 |
| 13 | 159 | | 275 | | 561 | | 12,010 | |
| 14 | 44 | | 239 | | 1,480 | | 9,900 | |
| 15 | 18 | | 50 | | 60 | | 70 | |
| 16 | 103 | | 129 | | 74 | | 1,173 | |
| 17 | UNSTABLE | | | | | | | |
| 18 | UNSTABLE | | | | | | | |
| 19 | UNSTABLE | | | | | | | |

[1]In seconds

EXAMPLE 20

The flash points of various stripper compositions were investigated. The flash points of the compositions listed in Table IV were obtained from the literature or were determined experimentally.

TABLE IV

| Compositions | Flash Point, °F. |
|---|---|
| p-Xylene | 80.5 |
| Methanol | 50.5 |
| Trioxane | 94.0 |
| 9:1 p-Xylene:Methanol | 52.0 |
| 7:3 p-Xylene:Methanol | 45.0 |
| 1:1 p-Xylene:Methanol | 46.0 |
| 9:1 p-Xylene:Trioxane | 74.5 |
| 2:1:2 p-Xylene:Trioxane:Methanol | 41.0 |
| 11:7:2 p-Xylene:Methanol:Trioxane | 45.5 |
| Ex. 11 | 62 |
| Ex. 12 | 70 |
| Ex. 15 | 68–78 |

It is apparent that the water-based solvent compositions of this invention have notably higher flash points than the conventional non-aqueous solvent strippers and are consequently safer for use.

EXAMPLE 21

A stripper composition of aqueous trioxane using sodium laurate as the surfactant was formulated and tested on various coatings for stripping ability. The

TABLE II

WEIGHT PERCENTAGES OF COMPONENTS IN WATER BORNE STRIPPING COMPOSITIONS

| | Example Numbers | | | | | | | | |
|---|---|---|---|---|---|---|---|---|---|
| | 11 | 12 | 13 | 14 | 15 | 16 | 17 | 18 | 19 |
| Water | 48.6 | 50.0 | 48.3 | 48.3 | 50.1 | 48.5 | 48.5 | 48.5 | 48.5 |
| Trioxane | 13.5 | 13.2 | 16.1 | 16.2 | 15.4 | 16.2 | 16.2 | 16.2 | 16.2 |
| Ethanol | | | | 16.2 | | | | 16.1 | |
| n-Propanol | | | 16.3 | | | 16.2 | 16.2 | | 12.9 |
| n-Butanol | 13.5 | 13.1 | | | 8.3 | | | | |
| PMAC* | | | 16.3 | 16.2 | | 16.2 | 16.2 | 16.2 | 16.2 |
| SDS** | | | | | 7.5 | | | | |
| Triton X-100 | 1.7 | 1.6 | | | | | | | |
| Triton CF-10 | | | 1.8 | 1.8 | | 1.8 | 1.8 | 1.8 | 1.8 |
| Natrosol 330 PA | 1.0 | 1.0 | | 1.3 | 1.3 | 1.3 | 1.3 | 1.3 | 1.3 |
| n-Butylacetate | 13.5 | 12.1 | | | 11.9 | | | | |
| Natrosol 250H4BR | | | | | 1.9 | | | | |
| Toluene | 8.1 | 7.9 | | | | | | | |
| Xylene | | | | | 5.0 | | | | | 3.2 |
| Lanolin | | | | 1.0 | | | | | |

*Propylene glycol monomethyl ether acetate (Arco)
**Sodium Dodecyl Sulfate composition is set forth in Table V and the results are set forth in Table VI.

TABLE V

| Lauric Acid | 200 g (1 mole) | 5.62% |
|---|---|---|
| NaOH | 60 g (1.5 mole) | 1.69% |
| Amyl Alcohol | 400 g | 11.24% |
| Méthyl Benzoate | 100 g | 2.81% |
| PMAcetate | 400 g | 11.24% |
| Trioxane | 400 g | 11.24% |
| Water (Deionized) | 2000 g | 56.18% |
| Total | 3560 g | 100.02 |
| Solvent content | 35.52% | |
| Organic Content | 42.14% | |
| Water | 56.18% | |
| Non-volatile | 6.83% (as Sodium Laurate and NaOH) | |

TABLE VI

| | Stripping Times (Sec.) | | | |
|---|---|---|---|---|
| Temp | Urethane | Alkyd | Latex* | Varnish |
| 24° C. | 149 | 186 | 450 | 270 |
| 39 | 63 | 83 | 300 | 75 |
| 56 | 15 | 41 | 175 | 30 |
| 64 | 15 | 31 | 125 | 17 |

At 24° C., the above formula without trioxane took 340 sec to strip the alkyd.
*Latex becomes soft and can be simply rubbed or brushed off with running water or through the use of high pressure water jet.

The composition was an effective stripper and had enhanced stripping ability as the temperature increased. The composition had a Flash Point of 110–115° F.

EXAMPLE 22

An additional aqueous trioxane composition was formulated using sodium dodecyl sulfate as surfactant and tested. The composition is set forth in Table VII and the results of the stripping investigation are set forth in Table VIII.

TABLE VII

| SDS | 374 g | 9.20% |
|---|---|---|
| PMAcetate | 473 g | 11.63% |
| Amyl Alcohol | 410 g | 10.08% |
| Methyl Benzoate | 200 g | 4.92% |
| Trioxane | 610 g | 15.00% |
| Water (Deionized) | 2000 g | 49.18% |
| Total | 4067 g | 100.01% |
| Solvent content | 41.63% | |
| Organic Content | 50.82% | |
| Water | 49.18% | |
| Non-volatile | 9.20% (as SDS) | |

TABLE VIII

| | Stripping Times (Sec.) | | | |
|---|---|---|---|---|
| Temp | Urethane | Alkyd | Latex* | Varnish |
| 24° C. | 90 | 110 | 120 | 100 |
| 36 | 80 | 96 | 100 | 50 |
| 50 | 35 | 56 | 55 | 40 |
| 60 | 12 | 29 | 40 | 26 |

*Latex becomes soft and can be simply rubbed or brushed off with running water or through the use of a high pressure water jet.

This composition also had improved effectiveness as the temperature was increased. The composition had a Flash Point of 110–114° F.

What is claimed is:

1. A stripping composition comprising from about 30 to about 70 wt.% water, from about 5 to about 30 wt.% trioxane, from about 5 to about 20 wt.% surfactant and no greater than about 30 wt.% of said organic cosolvent.

2. The stripping composition of claim 1, wherein said surfactant has an HLB value of at least about 10.

3. The stripping composition of claim 1, wherein said surfactant has an HLB value of at least about 30.

4. The stripping composition of claim 1 wherein said organic cosolvents are added in amounts of from about 10 to about 30 wt.% of the stripping composition.

5. The stripping composition of claim 4 wherein the maximum amount of organic cosolvent addition does not exceed about 25 percent by weight of the total composition.

6. The stripping composition of claim 1 wherein said organic cosolvents comprise a mixture of an aliphatic alcohol, an aliphatic ester and an aromatic hydrocarbon or minimally hetero-substituted derivative thereof.

7. The stripping composition of claim 6, wherein said aliphatic alcohol comprises a $C_1$–$C_6$ alcohol and said ester is selected from the group consisting of a $C_1$–$C_4$ alkyl ester, a $C_1$–$C_6$ alkylene glycol ester, and a $C_1$–$C_6$ alkylene glycol monoalkyl ether ester of a $C_2$–$C_6$ alkanoic acid.

8. The stripping composition of claim 6 wherein said aromatic hydrocarbon is selected from the group consisting of benzene, toluene, xylenes, alkyl-substituted derivatives thereof, $C_1$–$C_4$ carbonyl-substituted derivative thereof, $C_1$–$C_4$ alkoxy-substituted derivatives thereof and $C_1$–$C_4$ alkyl ester-substituted derivatives thereof.

9. The stripping composition of claim 7 wherein said alcohol is amyl alcohol.

10. The stripping composition of claim 7 wherein said aromatic hydrocarbon is an alkyl benzoate.

11. The stripping composition of claim 7 wherein said ester is said alkylene glycol monoalkyl ether ester of an alkanoic acid.

12. The stripping composition of claim 11 wherein said ester is propylene glycol monomethyl ether acetate.

13. The stripping composition of claim 6 wherein said stripper composition has a flash point of greater than 100° F.

14. An aqueous stripping composition for removing coatings from surfaces comprising from about 30 to 70 wt.% water, from about 5 to about 30 wt.% trioxane, from about 5 to about 20 wt.% of a surfactant, from about 1 to about 10 wt.% of an aromatic hydrocarbon or minimally hetero substituted derivative thereof, from about 5 to about 12 wt.% of an aliphatic alcohol and from about 5 to about 14 wt.% of an ester of an aliphatic acid.

15. The aqueous stripping composition of claim 14 wherein said surfactant has an HLB value of at least 10.

16. The aqueous stripping composition of claim 14 wherein said surfactant has an HLB value of at least about 30.

17. The aqueous stripping composition of claim 14 wherein said surfactant is selected from the group consisting of sodium dodecyl sulfate and sodium laurate.

18. The aqueous stripping composition of claim 14 wherein said aliphatic alcohol comprises $C_1$–$C_6$ aliphatic alcohols.

19. The aqueous stripping composition of claim 18 wherein said alcohol is amyl alcohol.

20. The aqueous stripping composition of claim 14 wherein said ester comprises a $C_1$–$C_4$ alkyl ester, an alkylene glycol ester or an alkylene glycol monoalkyl ether ester of $C_2$–$C_6$ alkanoic acids.

21. The aqueous stripping composition of claim 20 wherein said ester comprises propylene glycol monomethyl ether acetate.

22. The aqueous stripping composition of claim 14 wherein the hetero-substituted aromatic comprises $C_1$–$C_4$ carbonyl-substituted, $C_1$–$C_4$ alkoxy-substituted or $C_1$–$C_4$ alkyl ester-substituted aromatics.

23. The aqueous stripping composition of claim 22 wherein said aromatic hydrocarbon or minimally hetero-substituted derivative thereof comprises methyl benzoate.

24. An aqueous stripping composition comprising from about 30 to 60 wt.% water, from about 7 to about 20 wt.% trioxane, from about 5 to about 10 wt.% of surfactant, from about 2 to about 5 wt.% of an aromatic hydrocarbon or minimally hetero-substituted derivative thereof, from about 8 to about 12 wt.% aliphatic alcohol and from about 8 to about 12 wt.% of an ester of an aliphatic acid.

25. The aqueous stripping composition of claim 24 wherein said surfactant has an HLB value of at least about 30.

26. The aqueous stripping composition of claim 25 wherein said surfactant is selected from the group consisting of sodium laurate and sodium dodecyl sulfate, said alcohol is amyl alcohol, said aromatic hydrocarbon or minimally hetero-substituted derivative thereof is methyl benzoate and said ester is propylene glycol monomethyl ether acetate.

27. The aqueous stripping composition of claim 24 wherein said stripping composition has a flash point of greater than about 100° F.

* * * * *

UNITED STATES PATENT AND TRADEMARK OFFICE
CERTIFICATE OF CORRECTION

PATENT NO. : 4,956,115
DATED : September 11, 1990
INVENTOR(S) : Michael R. Van De Mark It is certified that error appears in the above-identified patent and that said Letters Patent is hereby corrected as shown below:

Claim 1, column 11, line 67, delete "said".

Claim 1, column 11, line 68, change "vent" to --vents--.

Signed and Sealed this

Seventeenth Day of December, 1991

Attest:

HARRY F. MANBECK, JR.

*Attesting Officer*  *Commissioner of Patents and Trademarks*